(12) United States Patent
Han et al.

(10) Patent No.: US 12,498,966 B2
(45) Date of Patent: Dec. 16, 2025

(54) MONITORING CONTAINER-IMPLEMENTED SOFTWARE APPLICATIONS

(71) Applicant: SAP SE, Walldorf (DE)

(72) Inventors: Sunyoung Han, Seoul (KR); Young Hun Kim, Bucheon (KR); Jongheon Park, Yongin-si (KR); Ye Fan, Xi'an (CN); Guanghui Qiu, Xi'an (CN); Hui Feng, Shanghai (CN); Henning Zahn, Muehlenbeck (DE); Thomas Loetzer, Berlin (DE); Chul Won Lee, Seoul (KR)

(73) Assignee: SAP SE, Walldorf (DE)

( * ) Notice: Subject to any disclaimer, the term of this patent is extended or adjusted under 35 U.S.C. 154(b) by 712 days.

(21) Appl. No.: 17/559,465

(22) Filed: Dec. 22, 2021

(65) Prior Publication Data

US 2023/0195512 A1 Jun. 22, 2023

(51) Int. Cl.
*G06F 9/48* (2006.01)
*G06F 9/455* (2018.01)
*G06F 9/50* (2006.01)
*G06F 11/30* (2006.01)
*G06F 11/34* (2006.01)

(52) U.S. Cl.
CPC .......... *G06F 9/485* (2013.01); *G06F 9/45558* (2013.01); *G06F 9/5077* (2013.01); *G06F 11/3409* (2013.01); *G06F 2009/4557* (2013.01); *G06F 2009/45591* (2013.01); *G06F 2209/505* (2013.01); *G06F 2209/508* (2013.01)

(58) Field of Classification Search
CPC .... G06F 9/485; G06F 9/45558; G06F 9/5077; G06F 11/3409; G06F 2009/4557; G06F 2009/45591; G06F 2209/505; G06F 2209/508
See application file for complete search history.

(56) References Cited

U.S. PATENT DOCUMENTS

| 8,316,438 B1* | 11/2012 | Bush | H04L 12/66 726/22 |
| 11,336,733 B2* | 5/2022 | Awate | H04L 61/4552 |
| 2006/0047818 A1* | 3/2006 | Kruglick | H04L 69/18 709/227 |
| 2011/0161961 A1* | 6/2011 | Fu | G06F 9/5027 718/102 |
| 2016/0378824 A1* | 12/2016 | Li | G06F 16/24532 707/715 |
| 2017/0315795 A1* | 11/2017 | Keller | G06F 11/3006 |
| 2017/0324678 A1* | 11/2017 | Li | H04L 67/1097 |
| 2017/0353371 A1* | 12/2017 | Wu | H04L 43/0805 |
| 2018/0210801 A1* | 7/2018 | Wu | H04L 43/20 |

* cited by examiner

*Primary Examiner* — Mustafa A Amin
(74) *Attorney, Agent, or Firm* — SCHWEGMAN LUNDBERG & WOESSNER, P.A.

(57) ABSTRACT

Various examples are directed to systems and methods for monitoring a plurality of container-implemented software application instances. A first ping agent executing in an orchestration container may launch a worker process in the orchestration container. The worker process may launch first and second worker threads in the orchestration container. The first worker thread may send a first ping message to a first application instance executing in a first application container outside the orchestration cluster. The second worker thread may send a second ping message to a second application instance executing in a second application container outside the orchestration cluster.

20 Claims, 7 Drawing Sheets

MONITORING CONTAINER-IMPLEMENTED SOFTWARE APPLICATIONS

BACKGROUND

Traditionally, software has been self-contained and executed on one or more local machines. An enterprise desiring to use a software tool builds an on-premise computing system and executes a software application to provide the tool on that computing system. The software application may be developed by the enterprise and/or purchased from a third-party software provider. Users access the software tool directly from the computing system or remotely via a networked user computing device. Administrator users of the on-premise computing system can monitor the operations of the computing system and applications at one location.

BRIEF DESCRIPTION OF DRAWINGS

The present disclosure is illustrated by way of example and not limitation in the following figures.

DETAILED DESCRIPTION

Figure 1:
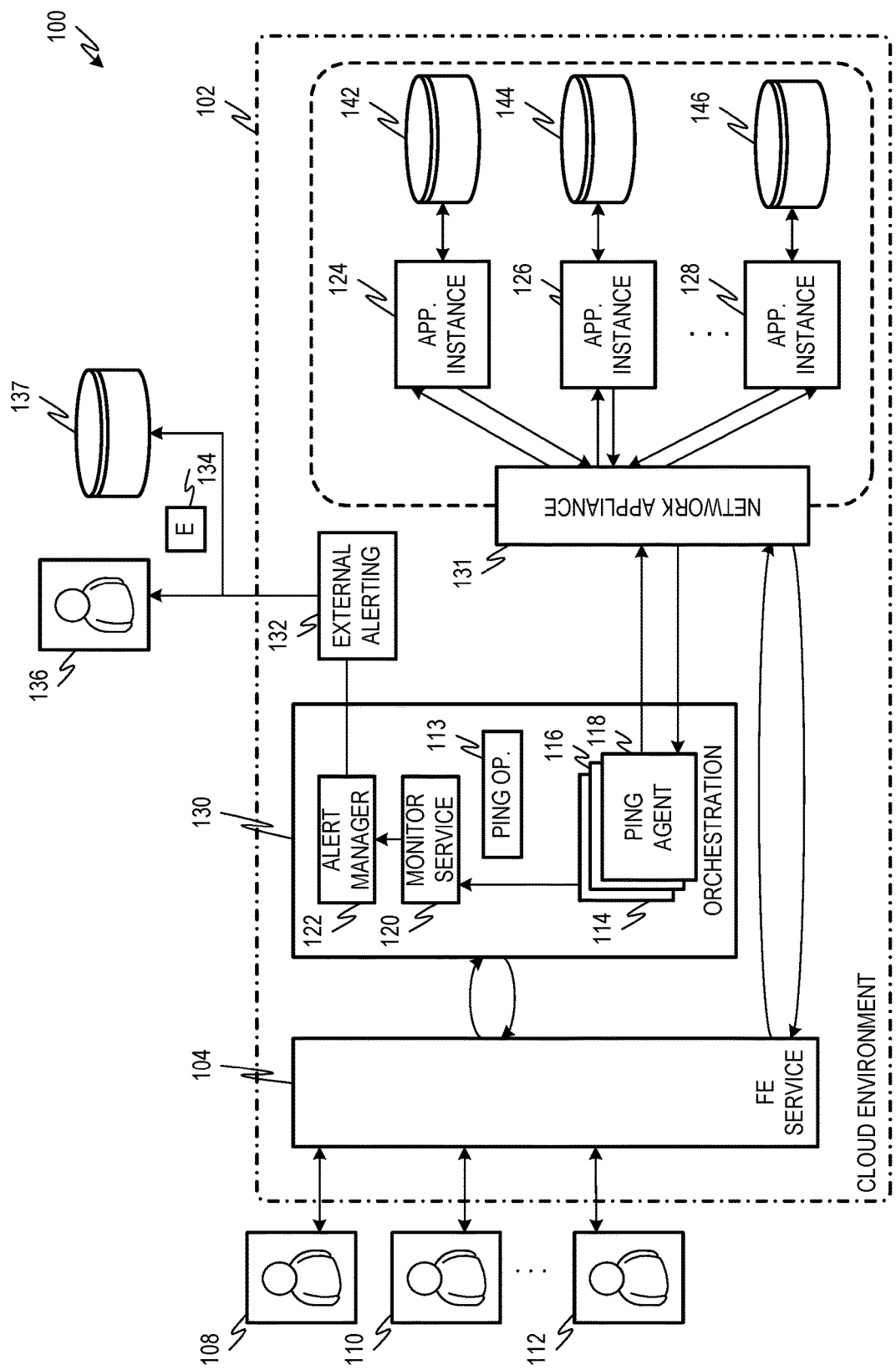
FIG. 1 is a diagram showing one example of an arrangement including an orchestration cluster implementing multi-threaded ping agents.

In many circumstances, it is desirable to build and use container-implemented software applications. A container is an executable unit that includes code for running an application, service, or other software. A container executes on a computing system that includes an operating system. The container itself may implement, a file system, various system libraries, and executable software applications, services, and the like. During execution, a container may be provided with access to hardware resources, such as processor resources, memory resources, and the like through the operating system of the computing system. In this way, the container may be lightweight and decoupled from underlying computing hardware.

Container-implemented software applications may provide various advantages over non-container based applications. For example, a container-implemented software application utilizes resources assigned to the container and may not interact directly with the underlying operating system. Because of this, a container-implemented application may be executable at a variety of different computing systems having different hardware and different operating systems. This flexibility makes container-based architectures suitable for execution in a cloud environment. A cloud environment includes one or more data centers implementing one or more virtual and/or hardware servers. The cloud environment may execute one or more container-implemented applications, for example, to provide a software tool to a group of users (e.g., a group of users associated with an entity that purchases access to the software tool). Each application instance may execute within one or more containers, where the containers themselves execute at the various computing devices that make up the cloud environment. Because the containers are decoupled from the underlying hardware of the cloud environment, managing the applications and the resources of hardware-diverse cloud environments may be simplified.

Container-implemented software applications may be managed by a container management system, such as a Kubernetes® container management system. A container management system provides agents and services that monitor and manage the execution of containers. For example, a container management system may monitor and/or manage the allocation, sharing, and balance of resources to and between containers. A container management system may also detect when a container has crashed or otherwise failed and take a corrective action such as, for example, spinning up a replacement for a crashed container.

There are some circumstances where it is desirable to monitor the health and/or status of a container-implemented application beyond the monitoring offered by a container management system, such as Kubernetes®. For example, there may be circumstances in which a container-implemented software application can fail without the application instance itself or the associated container crashing. Consider an example of a container-implemented application instance in a cloud environment. If network connections to the application instance fail, the application itself may be in a failure state even if the container is running. Also, the container management system may not be configured to make external reports of container downtime. Accordingly, an outside system monitoring application availability, such as for service level agreement (SLA) compliance, may not be able to operate based on standard container management systems.

These and other challenges may be addressed utilizing a ping agent. A ping agent is a software component that is configured to send a ping message to a subject software component, such as an application instance executing in a container. The ping message may request a return message from the subject software component. The return message (or lack of a return message if none is received) may be used to determine the status of the subject software component.

A ping agent or ping agents may be executed in conjunction with a ping operator. The ping operator may monitor the load status of multiple ping agents. The ping operator may assign software components (e.g., application instances) to respective ping agents, for example, based on the load of the respective ping agents.

Using ping agents in conjunction with container-implemented software applications, however, can raise additional challenges. For example, cloud environments and other large-scale computing systems may execute a very large number of container-implemented application instances. Executing a ping agent for each application instance may require significant computing resources. This may make it difficult to incorporate ping agents into existing container management system structures, such as orchestration container clusters.

Various examples described herein address these and other challenges utilizing a multi-threaded ping agent. A multi-threaded ping agent, in some examples, is executed in an orchestration container that is part of an orchestration container cluster for managing container-based applications. The multi-threaded ping agent may include a worker process and a plurality of worker threads. Each worker thread may be instructed to ping a different application instance. In this way, a single ping agent may be configured to perform a ping function with respect to multiple container-implemented application instances.

FIG. 1 is a diagram showing one example of an arrangement including an orchestration cluster 130 implementing multi-threaded ping agents 114, 116, 118. The arrangement 100 includes a cloud environment 102 that executes a plurality of application instances 124, 126, 128 along with various services 104, 130 to provide one or more software tools, such as a database management application, to one or more user groups 108, 110, 112.

The cloud environment 102 may include one or more computing devices, such as servers, for executing the application instances 124, 126, 128 and services 104, 130. In some examples, the cloud environment 102 is one of a number of cloud environments implemented by a cloud service provider at different geographic locations. For example, the cloud environment 102 may be implemented at a data center or data centers geographically near to the user groups 108, 110, 112 so as to minimize network latencies to the user groups 108, 110, 112. Other cloud environments similar to the cloud environment 102 may be implemented at data centers geographically near to other user groups to provide the application to those user groups.

User groups 108, 110, 112 indicate groups of one or more users who develop and/or use applications instances 124, 126, 128 at the cloud environment 102. In some examples, each user group 108, 110, 112 is associated with a stakeholder. For example, some user groups 108, 110, 112 are associated with stakeholders who are customer entities. A customer entity purchases or otherwise acquires access to application instances 124, 126, 128. A user group 108, 110, 112 associated with a customer entity may include users who utilize one or more application instances 124, 126, 128, for example, use the functionality of the applications. Also, for example, some user groups 108, 110, 112 are associated with internal stakeholders of an entity providing the software application. For example, some user groups 108, 110, 112 may be associated with a development group for developing some or all of the application instances 124, 126, 128, a QA and/or testing user group for testing application instances 124, 126, 128, and/or the like. User groups 108, 110, 112 may be associated with one or more application instances 124, 126, 128. For example, the user group 108 may be associated with application instance 124. The user group 110 may be associated with the application instance 126. The user group 112 may be associated with application instance 128, and so on. In some examples, a user group 108, 110, 112 may be associated with more than one instance of the application. For example, a user group 108, 110, 112 may execute an instance of the application for a production implementation and another instance or instances of the application for a testing or evaluation use.

The cloud environment 102 also implements persistences 142, 144, 146. For examples, when the application instances 124, 126, 128 implement a database management system, the persistences 142, 144, 146 may store data managed by the database management application. The persistences 142, 144, 146 may be implemented using any suitable data storage device or devices such as, for example, one or more disks, one or more solid state drives, one or more random access memories, etc. In some examples, the software application implemented at the cloud environment 102 is a database management application for an in-memory database such as, for example, the HANA® and S/4 HANA® systems available from SAP SE of Walldorf, Germany.

A persistence 142, 144, 146 may be associated with a user group. In the example of FIG. 1, the persistence 142 is associated with user group 108. The persistence 144 is associated with user group 110. The persistence 146 is associated with the user group 112, and so on. In some examples, a single user group 108, 110, 112 may be associated with more than one persistence. For example, a user group 108, 110, 112 may maintain one persistence for a production implementation of the software application and another persistence for a test or evaluation implementation of the software application.

The application instances 124, 126, 128 include a set of one or more executables, libraries, and/or other components executed within one or more containers implemented at the cloud environment 102. In some examples, one or more of the application instances 124, 126, 128 are executed within respective application clusters, as described herein in more detail with respect to FIGS. 2 and 3.

The cloud environment 102 also executes one or more services 104, 130 for managing the application instances 124, 126, 128. The services 104, 130 may execute at the cloud environment 102 in one or more containers and/or clusters of containers. A frontend service 104 may interface with the various user groups 108, 110, 112. For example, the frontend service 104 may provide users from various user groups 108, 110, 112 with a user interface to allow the users to manage application instances 124, 126, 128 that are executing and/or to launch new application instances. For example, the frontend service 104 may provide the various user groups 108, 110, 112 with functionality to create, upgrade, delete, and/or otherwise manage application instances 124, 126, 128.

An orchestration cluster 130 may provide various services to the application instances 128, 124, 126. In this example, the orchestration cluster 130 comprises ping agents 114, 116, 118, a ping operator 113, an alert monitoring service 120, and an alert manager service 122. Ping agents 114, 116, 118 may be multi-threaded ping agents, as described herein. For example, each ping agent 114, 116, 118 may execute a worker process and a plurality of worker threads, described in more detail herein with respect to FIG. 4. Each worker thread may ping a distinct application instance 124, 126, 128.

The ping operator 113 may manage the respective ping agents 114, 116, 118. For example, the orchestration cluster 130 may be assigned application instances 124, 126, 128 to manage. The ping operator 113 may manage lifecycle events associated with the application instances 124, 126, 129. When an application instance 124, 126, 128 spins up, the ping operator 113 assigns the application instance 124, 126, 128 to a ping agent 114, 116, 118 for monitoring, for example, as described in more detail with respect to FIG. 3. When an application instance 124, 126, 128 spins down, the ping operator 113 may modify the assignment of application instances 124, 126, 128 to ping agents to remove the spun-down application instance 124, 126, 128 from its previously-assigned ping agent 114, 116, 118. The ping operator 113 may also monitor the load of application instances 124, 126, 128 assigned to the various ping agents 114, 116, 118 and may modify the assignment of application instances 124, 126, 128 to ping agents 114, 116, 118 based on the load of the ping agents 114, 116, 118. For example, if a ping agent 114 is experiencing a high-load condition, the ping operator 113 may reassign one or more application previously assigned to ping agent 114 to a different ping agent 116, 118.

Each ping agent 114, 116, 118 may ping its assigned application instances 124, 126, 128 by sending a ping message. A ping message may be of any suitable format and may request a return message. The ping agents 114, 116, 118 may access application instances via one or more network appliances 131. Although one network appliance 131 is shown in FIG. 1, it will be appreciated that, in some examples, different application clusters may have different network appliances. Accordingly, ping agents 114, 116, 118 may send ping messages to different application instances 124, 126, 128 via different network appliances. In some examples, each application instance 124, 126, 128 is part of an application cluster having its own network appliance 131. In this way the ping process described here may the operability of the network appliances as well as the application instances 124, 126, 128.

If a ping message is successfully transmitted and received by an application instance 124, 126, 128 and the application instance 124, 126, 128 is executing properly, the application instance 124, 126, 128 sends a return message to the sending ping agent 114, 116, 118. Based on replies to the ping messages (or lack of a reply if no return message is received), the ping agents 114, 16, 118 determine one or more availability metrics for the respective application instances 124, 126, 128.

In some examples, if a ping agent 114, 116, 118 determines an availability metric for an application instance 124, 126, 128 indicating that the application instance 124, 126, 128 has failed, it may provide an indication of the failure to an alert monitoring service 120 of the orchestration cluster 130. The alert monitoring service 120 may execute in an orchestration container at the orchestration cluster 130 and may monitor various other services executing at the orchestration cluster 130 including the ping agents 114, 116, 118.

Upon receiving an indication of an application instance failure from a ping agent 114, 116, 118, the alert monitoring service 120 may provide the indication to an alert manager service 122. The alert manager service 122 may provide data about the failure to an external alerting agent 132. The external alerting agent 132 may execute outside of the orchestration cluster 130. The external alerting agent 132 is shown in this example executing within the cloud environment 102, although in various examples the external alerting agent 132 may execute outside of the cloud environment 102. The external alerting agent 132 may send error data 134 describing the failed application instance 124, 126, 128 to an administrative user group 136 comprising one or more administrative users. In some examples, the administrative user group may take a corrective action to repair and/or restart the failed application instance 124, 126, 128. In some examples, the external alerting agent 132 (in addition to or instead of sending the error data 134 to the administrative user group 136) provides the error data 134 to an error data store 137. The error data 134 may be accessed from the error data store 137 after storage, for example, to determine compliance with an SLA for the software application provided to one or more of the user groups 108, 110, 112.

Figure 2:
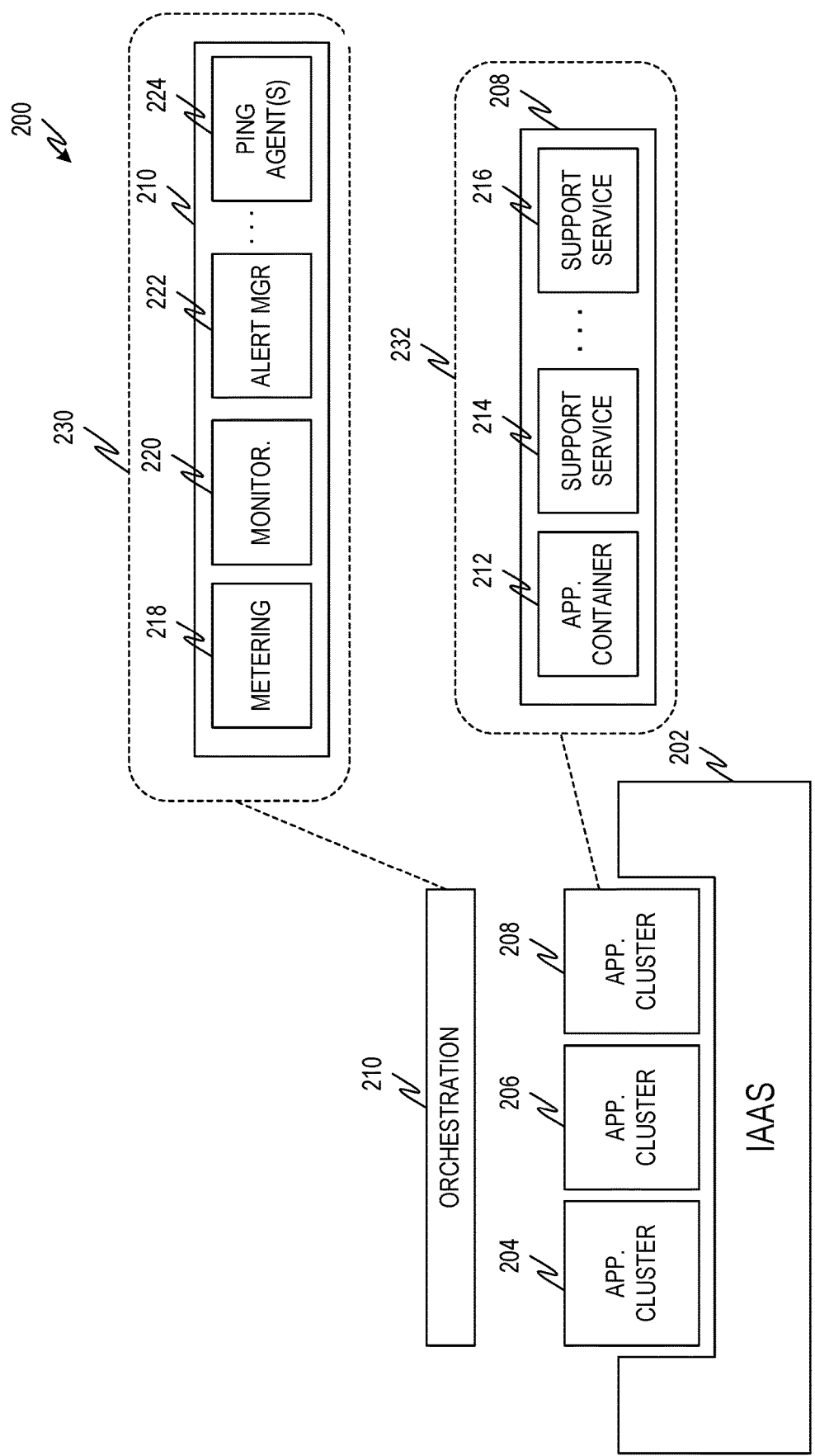
FIG. 2 is a diagram showing one example architecture for various application instances in a cloud environment.

FIG. 2 is a diagram showing one example architecture 200 for various application instances in a cloud environment. The architecture 200 comprises an infrastructure as a service (IaaS) layer 202, various application clusters 204, 206, 208, and an orchestration cluster. The IaaS layer 202 may be provided by a cloud service hyperscaler or other cloud service provider. The IaaS layer 202 may implement a virtual, scalable infrastructure including, for example, virtual servers, virtual networking, virtual databases and/or other data stores, and the like. The application clusters 204, 206, 208 and the orchestration cluster 210 may execute at the infrastructure provided by the IaaS layer 202. For example, the various containers making up the application clusters 204, 206, 208 and orchestration cluster 210 may execute at computing resources provided by the IaaS layer 202.

FIG. 2 shows an example breakout window 232 including a more detailed diagram of the application cluster 208. As illustrated in the breakout window 232, the application cluster 208 may include an application container 212 and various support service containers 214, 216. An application instance may execute in the application container 212. Support service containers 214, 216 may execute various support services for supporting the application instance executing in the application container 212 including, for example, connectivity services, monitoring services, and the like. The application clusters 204, 206, 208 may be arranged in a manner similar to that of the application cluster 208 shown in the breakout window 232. In some examples, different application clusters 204, 206, 208 may execute application instances for different software applications and/or different forms of the same software application. Also, although three application clusters 204, 206, 208 are shown in FIG. 2, it will appreciated that some arrangements will include a different number of application clusters including, for example, more than three application clusters.

FIG. 2 also shows a breakout window 230 including a more detailed diagram of the orchestration cluster 210. As illustrated in the breakout window 230, the orchestration cluster 210 may include various containers including a metering container 218, a monitoring service container 220, an alert manager container 222, and an example ping agent container 224. The ping agent container 224 may execute one or more ping agents, such as described herein. The alert manager container 222 may execute an alert manager, such as the alert manager service 122. The monitoring container 220 may execute a monitoring service, such as the alert monitoring service 120 of FIG. 1. The monitoring service, in some examples, is a Prometheus™ service. The breakout window 230 shows other example containers that may execute at the orchestration cluster 210 including a metering container 218. The metering container may execute a metering service. The metering service may monitor use by the various user groups, such as user groups 108, 110, 112 of one or more application instances executing at the respective application clusters 204, 206, 208. It will be appreciated that the orchestration cluster 210 may also execute other containers for executing other suitable services such as, for example, a backup service for creating backup copies of data generated and/or used by application instances, a connectivity service for configuring network arrangements for communicating with application instances, and the like.

Figure 3:
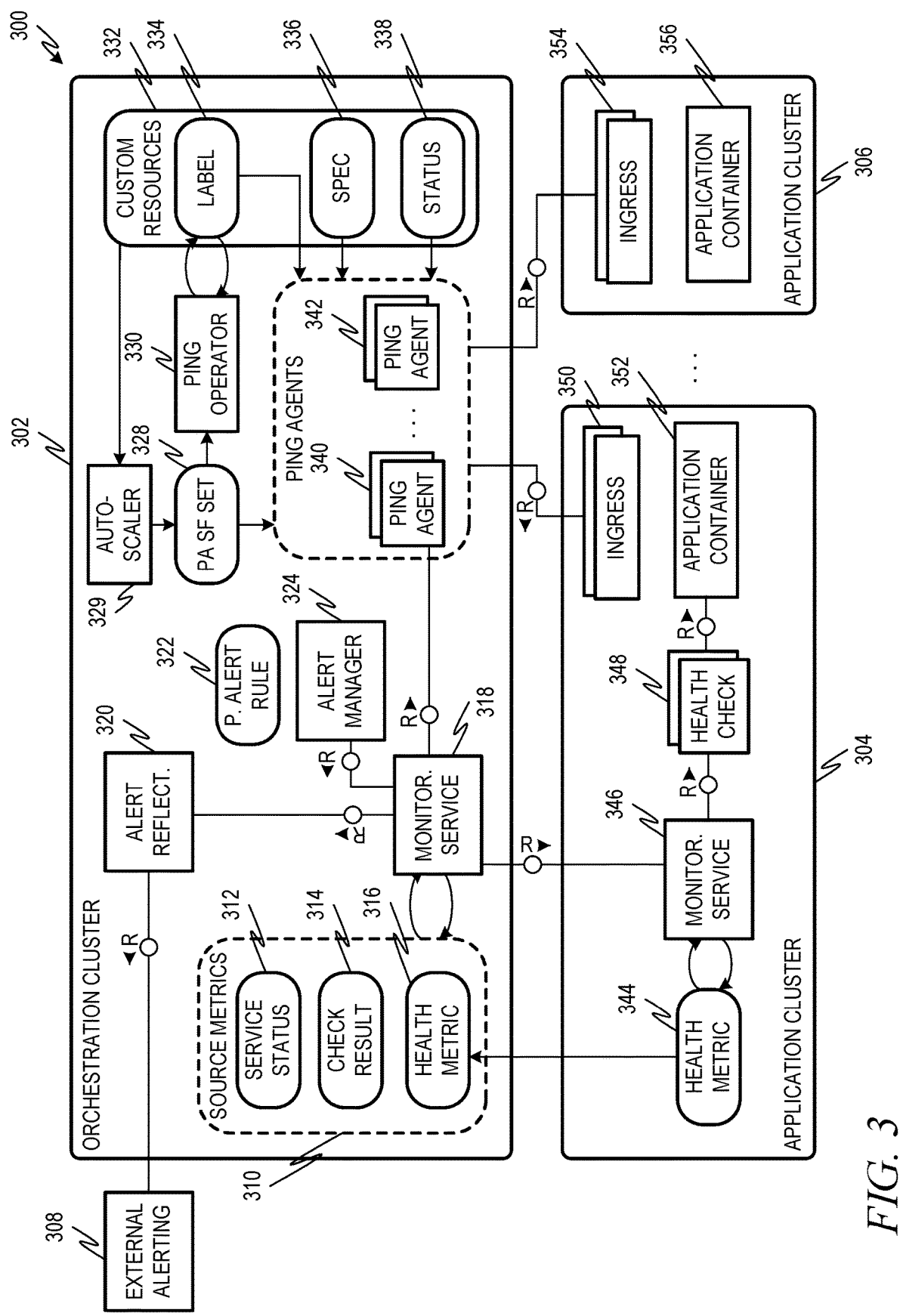
FIG. 3 is a diagram showing one example arrangement of an orchestration cluster and application clusters managed by the orchestration cluster.

FIG. 3 is a diagram showing one example arrangement of an orchestration cluster 302 and application clusters 304, 306 managed by the orchestration cluster 302. The orchestration cluster 302 comprises various services to support application instances executing at the respective application clusters 304, 306. In the example of FIG. 3, two application clusters 304, 306 are managed by the orchestration cluster 302. It will be appreciated, however, that additional application clusters (not shown) may also be managed by the orchestration cluster 302. The services of the orchestration cluster 302 may execute, for example, in various containers in the orchestration cluster, which may be referred to as orchestration containers. The orchestration cluster 302 may implement a ping operator 330 and ping agents 340, 342 that may be or include multi-threaded ping agents as described herein.

In the example of FIG. 3, the orchestration cluster 302 comprises custom resource data 332 describing the various application clusters 304, 306 served by the orchestration cluster 302. Custom resource data 332 may be stored at a persistence associated with the orchestration cluster 302 and may include data describing the various applications, services, and/or other software implemented at the various application clusters 304, 306. In the example of FIG. 3, the custom resource data 332 include label data 334, specification data 336, and status data 338.

Label data 334 may include label objects describing the various application instances managed by the orchestration cluster 302. A label object for an application instance may indicate various information about the application instance including, for example, a name or identifier of the application instance, an Internet Protocol (IP), Universal Resource Locator (URL) or other suitable address for contacting the application instance, and the like. In some examples, as described herein, the label object for an application instance may also include an indication of a ping agent 340, 342 responsible for pinging the application instance. The ping operator 330, described herein, may assign different application instances to different ping agents 340, 342, for example, by writing the identifier of an assigned ping agent 340, 342 to the label data 334 for an application instance.

Spec data 336 may include spec objects describing the various application instances managed by the orchestration cluster 302. A spec object for an application instance may describe a specification, version, type or other similar data describing an application instance. Status data 338 may include status objects describing the various software applications managed by the orchestration cluster 302. A status object for an application instance may indicate the current status of the application instance (e.g., running, stopped, deleted, unknown).

In the example of FIG. 3, the orchestration cluster 302 also comprises source metric data 310. Source metric data 310 may be stored at a persistence associated with the orchestration cluster 302 and may include data describing the various applications, services, and/or other software implemented at the various application clusters 304, 306. Source metric data 310 are templates describing metrics that can be generated to describe various application instances. For example, source metric data 310 may provide descriptive data that is used by a ping agent 340, 342 or other suitable service to determine values of different metrics for the application instance.

Various source metric data 310 may be used. The example of FIG. 3 shows service status 312 source metrics, check result 314 source metrics, and health metric 316 source metrics. Service status 312 source metrics describe different service statuses that an application instance may have including, for example, descriptions of each service status. For example, a ping agent 340, 342 or other component may utilize a service status 312 for an application instance or type of application instance to determine a status object for the instance. A check result 314 source metric comprises data describing how to interpret a result of sending a ping message to an application instance, as described herein. A health metric 316 may describe how to determine a health metric for an application instance.

The orchestration cluster 302 also includes a ping operator 330. The ping operator 330 may execute, for example, in a container of the orchestration cluster 302 and may manage lifecycle events associated with application instances managed by the orchestration cluster 302. For example, when a new application instance to be managed by the orchestration cluster 302 is detected, the ping operator 330 may assign the newly-executing application instance to a ping agent 340, 342. The ping operator 330 may assign an application instance to a ping agent 340, for example, by writing an identifier of the selected ping agent to the label object associated with the newly-executing application instance stored at the label data 334.

In the example of FIG. 3, the ping agents 340, 342 include ping agents 340, 342 of different types. For example, ping agents 340 may ping application instances of a first type while ping agents 342 may ping application instances of a second type different than the first type. The number and type of ping agents executing at a given time may be managed by an autoscaler service 329. In some examples, the autoscaler service 329 is a Horizontal Pod Autoscaler (HPA). The autoscaler service 320 monitors various resource utilization metrics at the orchestration cluster 302 including, for example, resource utilization metrics describing resources utilized by the various ping agents 340, 342. This may include, for example, memory utilization, processor utilization, etc. Based on one or more availability metrics, the autoscaler service 329 may modify the number and/or type of ping agents 340, 342 executing at the orchestration cluster 302. For example, the autoscaler service 329 may maintain ping agent stateful set data 328 describing the number and type of ping agents 340, 342 that should be executed. The orchestration cluster 302 may launch and/or spin down ping agents 340, 342 based on the ping agent stateful set data 328.

In various examples, the ping operator 330 is also configured to read the ping agent stateful set data 328. As ping agents 340, 342 are spun up and down, the ping operator 330 may modify its assignment of different application instances to different ping agents 340, 342, for example, by modifying label objects for the respective application instances to indicate currently-active ping agents 340, 342.

Figure 4:
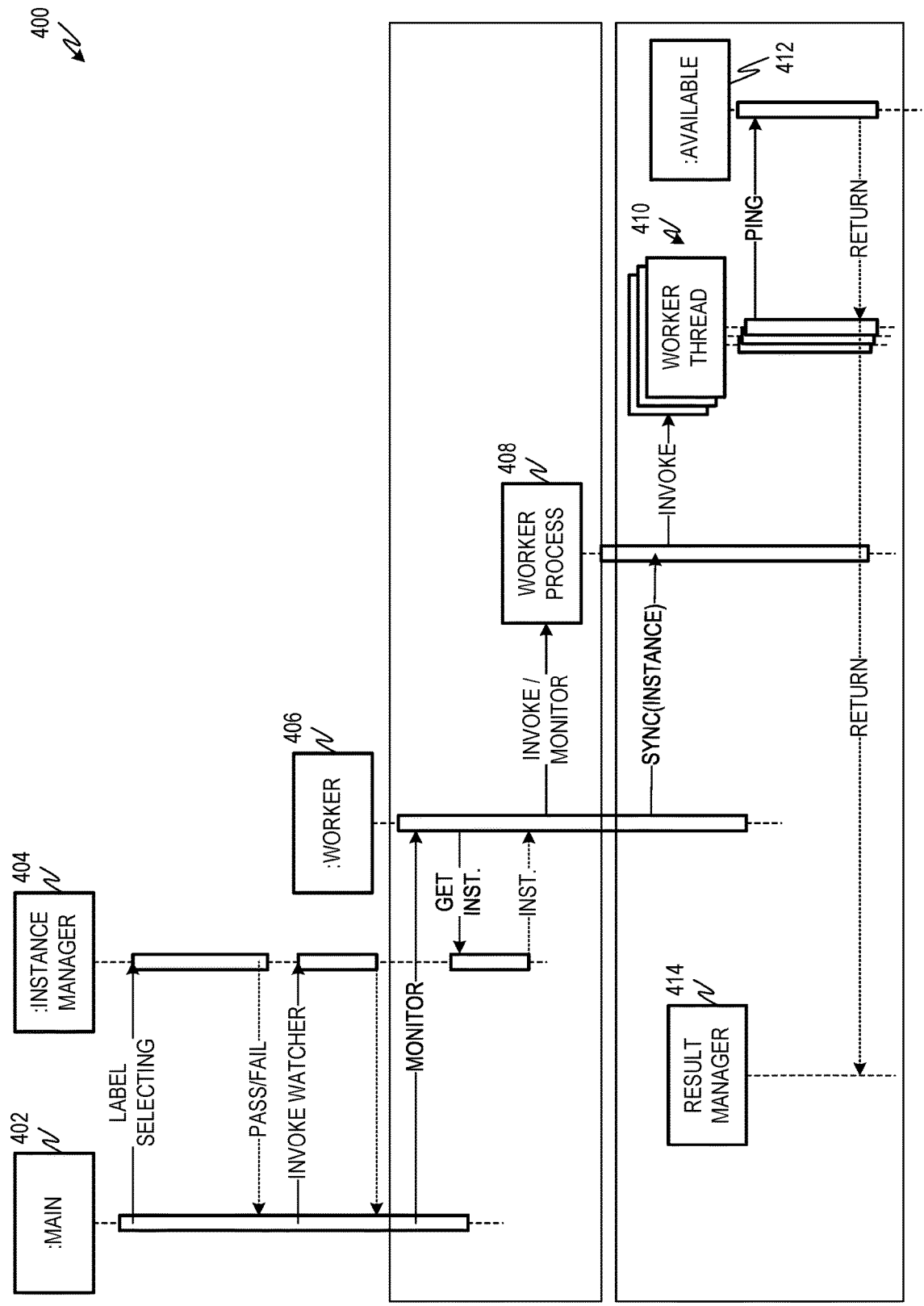
FIG. 4 is a sequence diagram showing the operation of a ping agent.

Each ping agent 340, 342 may be programmed to ping multiple application instances utilizing multiple worker threads, for example, as described in more detail herein with respect to FIG. 4. Ping agents 340, 342 may access custom resource data 332. For example, ping agents 340, 342 may access label data 334 to identify label objects referencing the ping agents, which may correspond to application instances assigned to the respective ping agents 340, 342 by the ping operator 330.

The ping agents 340, 342 may generate source metric data 310 for their assigned application instances. The ping agents 340, 342 send ping messages to their respective assigned application instances and await responses. Based on the received responses (or lack of response), the ping agent 340, 342 may generate source metric data 310 including metrics that describe the application instances instance or instances assigned to the ping agents 340, 342.

Source metric data 310 may include, for example, a service status metric 312, a check result metric 314, and/or a health metric 316. The service status metric 312 may indicate the status of the ping agents 340 and ping operator 330. For example, if the ping agent 340, 342 assigned to an application is active, the service status metric 312 for that application instance may so indicate. A check result metric 314 may indicate the results of a ping test to an application instance. For example, a check result metric 314 may indicate, for example, whether the application instance responded to a ping and, if so, the time between the sending of the ping message and the receipt of the return message. A health metric 316 may indicate a health status of the application instance and may be determined, for example, based on the return messages (if any) received from the application instance.

The source metric data 310 generated by the various ping agents 340, 342 for their assigned application instances may be monitored by an event monitoring service 318. The event monitoring service 318 may provide source metric data 310 generated by the respective ping agents 340, 342 to an alert manager service 324. The alert manager service 324 may, for example, apply a set of one or more ping alert rules 322 to the source metric data 310 generated by a ping agent 340, 342 for an application instance. For example, if the alert manager service 324 determines that the source metric data 310 for an application instance indicates a negative state of an application instance, the alert manager service 324 may initiate an alert message. A negative state of an application instance may be, for example, a state that indicates a lack of function or other error in an application instance. In some examples, a negative state of an application instance occurs with the application instance is out of compliance with a relevant SLA.

The alert manager service 324 may initiate an alert message, for example, by generating an alert event that is detected by the alert monitor service 318. In response to the alert event, the alert monitor service 318 may instruct an alert reflector service 320 to direct an alert message to an external alerting tool 308. The external alerting tool 308 may provide the alert message, for example, to an administrative user, such as the administrative user group 136 and/or to an error data store 137 of FIG. 1.

FIG. 3 also shows two example application clusters 304, 306. It will be appreciated that a single orchestration cluster 302, in some examples, is configured to manage more than two application clusters 304, 306 and/or may be configured to manage more different kinds of application clusters than application clusters 304, 306. The application clusters 304, 306 are provided herein as examples.

The application cluster 304 includes an application container 352 that may implement an application instance. The application instance may be of various different types including, for example, a database management application, a data lake management application, a communications management application, and/or the like. A health check service 348 may monitor the health of the application instance executing at the application container 352. For example, the application cluster 302 may include health metric 344 template data, which may be replicated from the health metric 316 template date for the type of application instance. The event monitoring service 346 may provide the health metric 344 template to the health check service 348, which may apply the health metric 344 template to the application instance to determine a health metric describing the application instance executing at the application container 352. If the health metric indicates a failure of the application instance, the health check service 348 may spin down the application container 352 and launch a replacement application container 352.

In some examples, the event monitor service 346 at the application cluster 350 is in communication with the event monitoring service 318 of the orchestration cluster. For example, the event monitoring services 346, 318 may create a copy of the health metric 344 determined by the health check service 348 at the source metric data 310 for the application instance at the orchestration cluster 310. In this way, the alert manager 324 may apply the alert rules 322 to results generated by the health check services 348 and, if the alert rules 322 so indicate, initiate an alert message as described herein.

An ingress component 350 of the application cluster 304 comprise various virtual network appliances for facilitating network communication between the application instance executing at the application container 352 and various other components. In some examples, ping messages provided to and received from the application instance executing at the application container 352 are routed via the ingress component 350.

The example application cluster 306 is shown with an application container 356 executing another application instance and an ingress component 354. The ingress component 354 may be similar to the ingress component 350 and may be configured to manage communications between the application instance executing at the application container 356 and various other components of the environment 300.

FIG. 4 is a sequence diagram showing the operation of a ping agent 400. Any of the ping agents 114, 116, 118, 222, 340, 342 described herein may operate in a manner similar to that of the ping agent 400 illustrated in FIG. 4. A main thread 402 of the ping agent 400 calls an instance manager function 404 to obtain label data describing label objects of application instances that have been assigned to the ping agent (e.g. by a ping operator 330 as described herein). The instance manager function 404 may access label data, such as label data 334 of FIG. 3, to identify label objects that reference an identifier of the ping agent. The instance manager function 404 may return to the main thread 402 an indication of application instances that have been assigned to the ping agent.

Optionally, the main thread 402 invokes the instance manager function 404 as a watcher to monitor events related to custom resource data 332 for the assigned application instances. For example, if a previously assigned application instance is spun down or deleted, this may be indicated by the custom resource data 332 associated with the application instance. If the instance manager function 404 detects an event indicating such a change, it may notify the main thread 402 so that the ping agent 400 does not utilize a worker thread 410 to send ping messages to an application instance that is no longer running. Also, for example, the ping operator 330, in some instances, may remove an application instance assigned to the ping agent 400 and assign that instance to another ping agent or assign a new application instance to the ping agent 400. This may be indicated when the ping operator 330 modifies the label object for the application instance. If the instance manager function 404 detects an event indicating such a change, it may notify the main thread 402.

The main thread 402 may invoke a worker function 406. In some examples, the main thread 402 also monitors the worker function 406, as described in more detail herein. Upon launch, the worker function 406 may query the instance manager function 404 to retrieve an indication of the application instances that have been assigned to the ping agent 400.

The worker function 406 may invoke and monitor a worker process 408. The worker process 408 may be instructed to perform a ping of a plurality of application instances. In some examples, one worker process 408 is invoked and instructed to ping all application instances assigned to the ping agent 400. In other examples, the worker function 406 may invoke multiple worker processes 408 and instruct each worker process 408 to ping a subset of the plurality of application instances assigned to the ping agent 400. The worker function 406, in some examples, synchronizes the instances assigned to the worker process 408 for pinging. For example, if the application instances assigned to the ping agent 400 change, the worker function 406 may receive an indication of the change from the instance manager function 404 and provide the change to the worker process 408.

The worker process 408 may invoke a plurality of worker threads 410. For example, the worker process 408 may invoke one worker thread for each application instance that is to be pinged by the ping agent 400. Each worker thread 410 sends a ping message to its assigned application instance and waits for a return message from the application instance. In the example of FIG. 4, the worker threads 410 send ping messages via an availability function 412. The availability function 412 may be configured to route the ping messages to the respective application instances and route any return messages to the proper worker thread 410.

A ping message sent by a worker thread 410 may either result in a return message being received from the application instance or a timeout if no return message is received. The worker thread 410 may determine one or more metrics for the application instance using the return message (or lack thereof). The metrics may be provided to a result manager function 414. In some examples, the worker thread 410 provides the return messages themselves to the result manager function 414, which may store the result messages for use later to derive metrics describing the application instances.

In some examples, worker threads 410 may execute as loops. For example, the worker threads 410 may be activated to initially send ping messages to the assigned application instances. When all worker threads 410 have sent their ping messages, the worker threads 410 may periodically determine if the availability function 412 has received a return message from a worker thread's assigned application instances. If a return message has been received, the worker thread 410 may send the return message to the result manger 414 and/or generate a metric as described herein. In some examples, the worker thread 410 may then terminate. If a worker thread 410 activates and determines that no return message has yet been received from its application instance, it may deactivate until its next check for a return message at the availability function 412.

If the worker thread 410 determines that, after a timeout threshold period, no return message has been received, it may return a timeout error to the availability function 412, indicating that the assigned application instance has failed to respond to the ping message. In some examples, the worker thread 410 will retry a check that initially returned a timeout error. For example, after a sleep period (e.g., 5 seconds, 1 second, 20 seconds, etc.), the worker thread 410 will send another ping message to the assigned application instance. If the additional ping message also results in a timeout error, the worker thread 410 may wait again for the sleep period before sending yet another ping message to the assigned application instance. This may be repeated up to a retry count. For example, if the retry count is three, the worker thread 410 may send up to three ping messages. If all three ping messages result in a timeout error, the availability function 412 may return an error for the assigned application instance.

In some examples, the worker threads 410 may execute independent of the worker process 408. For example, the worker process 408 may periodically spin up worker threads 410 to ping respective assigned application instances. If the worker process 408 crashes or is otherwise restarted, the worker threads 410 may continue to operate. The worker process 408 may be restarted to spin up the next set of worker threads 410.

Figure 5:
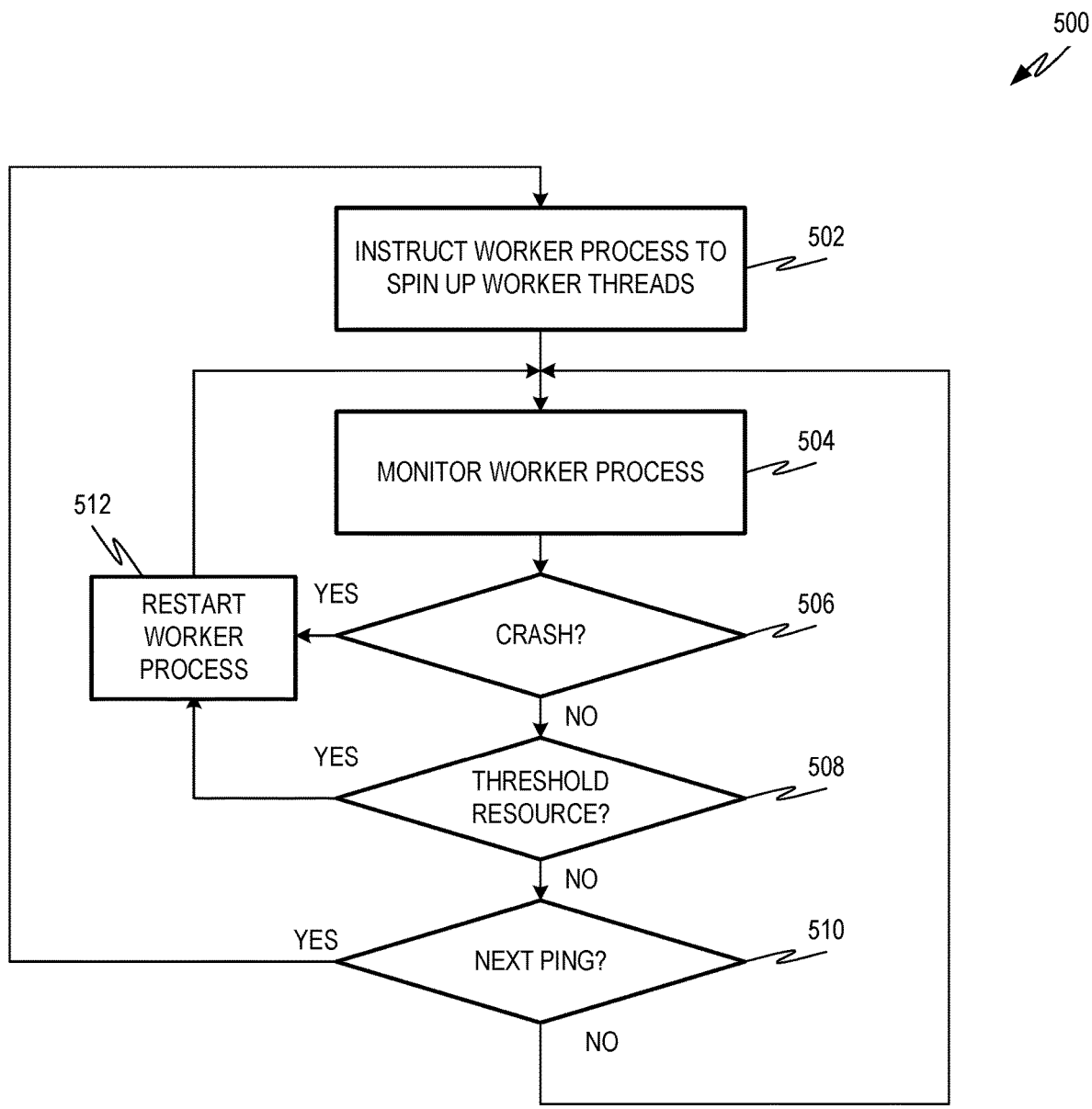
FIG. 5 is a diagram showing one example of a process flow for managing a worker process and worker threads of a multi-threaded ping agent.

FIG. 5 is a diagram showing one example of a process flow 500 that may be executed in a ping agent, such as the ping agent 400 or any of the other ping agents described herein, to manage a worker process 408 and worker threads 410. The process flow 500 may be executed, for example, by the main thread 402, the worker function 406, the worker process 408, and/or other suitable components of the ping agent.

At operation 502, the worker process 408 is instructed to spin up a set of worker threads 410. The worker threads 410 may operate, as described herein, to ping a plurality of application instances. At operation 504, the worker process 408 is monitored. For example, the worker process 408 may be monitored to determine its state and/or resource usage. At operation 506, it is determined whether the worker process 408 has crashed. At operation 508, it is determined whether the worker process 408 has exceeded a resource usage threshold. For example, the worker process 408 may exceed the resource usage threshold if it develops a memory leak and begins utilizing excessive memory resources.

If the worker process 408 has crashed at operation 506 and/or has exceeded the resource usage threshold at operation 508, then the worker process 408 may be restarted at operation 512. Restarting the worker process 408 may include stopping and/or deleting a current instance of the worker process 408 and spinning up a new version of the worker process 408. Worker threads 410 previously spun up by the previous instance of the worker process 408 may continue to execute. After restarting the worker process 408, the new worker process 408 may continue to be monitored at operation 504.

If the worker process remains running and operating under the threshold resource usage level, it may be determined at operation 510 whether it is time for a next ping of the application instances assigned to the ping agent 400. For example, the ping agent 400 may be configured to ping the assigned application instances periodically (e.g., every second, every minute, every ten minutes, etc.). If it is not time for a next ping ag operation 510, then the worker process 408 may continued to be monitored at operation 504. If it is time for a next ping at operation 510, the worker process may be instructed to spin up a new set of worker threads 410 at operation 502.

In view of the disclosure above, various examples are set forth below. It should be noted that one or more features of an example, taken in isolation or combination, should be considered within the disclosure of this application.

EXAMPLES

Example 1 is a system for monitoring a plurality of container-implemented software application instances, the system comprising: a hardware processor programmed to execute operations comprising: executing an orchestration cluster comprising a plurality of orchestration containers: executing a first ping agent in an orchestration container of the plurality of orchestration containers: launching, by the first ping agent, a worker process in the orchestration container: launching, by the worker process, a first worker thread in the orchestration container: sending, by the first worker thread, a first ping message to a first application instance executing in a first application container outside the orchestration cluster: launching, by the worker process, a second worker thread in the orchestration container; and sending, by the second worker thread, a second ping message to a second application instance executing in a second application container outside the orchestration cluster.

In Example 2, the subject matter of Example 1 optionally includes the operations further comprising: sending, by the worker process, an instance request message; and receiving, by the worker process, an instance response message, the instance response message describing a plurality of application instances executing outside of the orchestration cluster, the plurality of application instances comprising the first application instance and the second application instance.

In Example 3, the subject matter of any one or more of Examples 1-2 optionally includes the operations further comprising: executing a ping operator in the orchestration cluster: accessing, by the ping operator, label data describing a plurality of application instances executing outside of the orchestration cluster; and writing, by the ping operator, an indication of the first ping agent to a label object of the label data corresponding to the first application instance.

In Example 4, the subject matter of Example 3 optionally includes the operations further comprising: determining, by the ping operator, that the label data indicates a newly-executing application instance; and assigning the newly-executing application instance to the first ping agent.

In Example 5, the subject matter of any one or more of Examples 1-4 optionally includes the operations further comprising: accessing a resource utilization metric associated with a plurality of ping agents comprising the first ping agent; and based on the resource utilization metric, modifying a number of executing ping agents.

In Example 6, the subject matter of any one or more of Examples 1-5 optionally includes the operations further comprising: detecting, by the first ping agent, resource usage in excess of a threshold; and restarting, by the first ping agent, the worker process, wherein the first worker thread executes during the restarting of the worker process.

In Example 7, the subject matter of any one or more of Examples 1-6 optionally includes the operations further comprising: generating, by the first worker thread, a first metric describing the first application instance based on the first ping message: determining, by an alert manager executing at the orchestration cluster, that the first metric is associated with a negative state of the first application instance; and initiating, by the alert manager, an alert message indicating the negative state of the first application instance.

In Example 8, the subject matter of any one or more of Examples 1-7 optionally includes the operations further comprising: receiving, by the first ping agent and from a monitor service of the orchestration cluster, metric template data describing at least one application instance metric; and generating, by the first worker thread, metric data describing the first application instance, the metric data being based on the metric template data and the first ping message.

Example 9 is a method of monitoring a plurality of container-implemented software application instances, the method comprising: executing an orchestration cluster comprising a plurality of orchestration containers: executing a first ping agent in an orchestration container of the plurality of orchestration containers: launching, by the first ping agent, a worker process in the orchestration container: launching, by the worker process, a first worker thread in the orchestration container: sending, by the first worker thread, a first ping message to a first application instance executing in a first application container outside the orchestration cluster: launching, by the worker process, a second worker thread in the orchestration container; and sending, by the second worker thread, a second ping message to a second application instance executing in a second application container outside the orchestration cluster.

In Example 10, the subject matter of Example 9 optionally includes sending, by the worker process, an instance request message; and receiving, by the worker process, an instance response message, the instance response message describing a plurality of application instances executing outside of the orchestration cluster, the plurality of application instances comprising the first application instance and the second application instance.

In Example 11, the subject matter of any one or more of Examples 9-10 optionally includes executing a ping operator in the orchestration cluster: accessing, by the ping operator, label data describing a plurality of application instances executing outside of the orchestration cluster; and writing, by the ping operator, an indication of the first ping agent to a label object of the label data corresponding to the first application instance.

In Example 12, the subject matter of Example 11 optionally includes determining, by the ping operator, that the label data indicates a newly-executing application instance; and assigning the newly-executing application instance to the first ping agent.

In Example 13, the subject matter of any one or more of Examples 9-12 optionally includes accessing a resource utilization metric associated with a plurality of ping agents comprising the first ping agent; and based on the resource utilization metric, modifying a number of executing ping agents.

In Example 14, the subject matter of any one or more of Examples 9-13 optionally includes detecting, by the first ping agent, resource usage in excess of a threshold; and restarting, by the first ping agent, the worker process, wherein the first worker thread executes during the restarting of the worker process.

In Example 15, the subject matter of any one or more of Examples 9-14 optionally includes generating, by the first worker thread, a first metric describing the first application instance based on the first ping message: determining, by an alert manager executing at the orchestration cluster, that the first metric is associated with a negative state of the first application instance; and initiating, by the alert manager, an alert message indicating the negative state of the first application instance.

In Example 16, the subject matter of any one or more of Examples 9-15 optionally includes receiving, by the first ping agent and from a monitor service of the orchestration cluster, metric template data describing at least one application instance metric; and generating, by the first worker thread, metric data describing the first application instance, the metric data being based on the metric template data and the first ping message.

Example 17 is a non-transitory machine-readable medium comprising instructions thereon that, when executed by at least one hardware processor, causes the at least one hardware processor to perform operations comprising: executing an orchestration cluster comprising a plurality of orchestration containers: executing a first ping agent in an orchestration container of the plurality of orchestration containers: launching, by the first ping agent, a worker process in the orchestration container: launching, by the worker process, a first worker thread in the orchestration container: sending, by the first worker thread, a first ping message to a first application instance executing in a first application container outside the orchestration cluster: launching, by the worker process, a second worker thread in the orchestration container; and sending, by the second worker thread, a second ping message to a second application instance executing in a second application container outside the orchestration cluster.

In Example 18, the subject matter of Example 17 optionally includes the operations further comprising: sending, by the worker process, an instance request message; and receiving, by the worker process, an instance response message, the instance response message describing a plurality of application instances executing outside of the orchestration cluster, the plurality of application instances comprising the first application instance and the second application instance.

In Example 19, the subject matter of any one or more of Examples 17-18 optionally includes the operations further comprising: executing a ping operator in the orchestration cluster: accessing, by the ping operator, label data describing a plurality of application instances executing outside of the orchestration cluster; and writing, by the ping operator, an indication of the first ping agent to a label object of the label data corresponding to the first application instance.

In Example 20, the subject matter of Example 19 optionally includes the operations further comprising: determining, by the ping operator, that the label data indicates a newly-executing application instance; and assigning the newly-executing application instance to the first ping agent.

Figure 6:
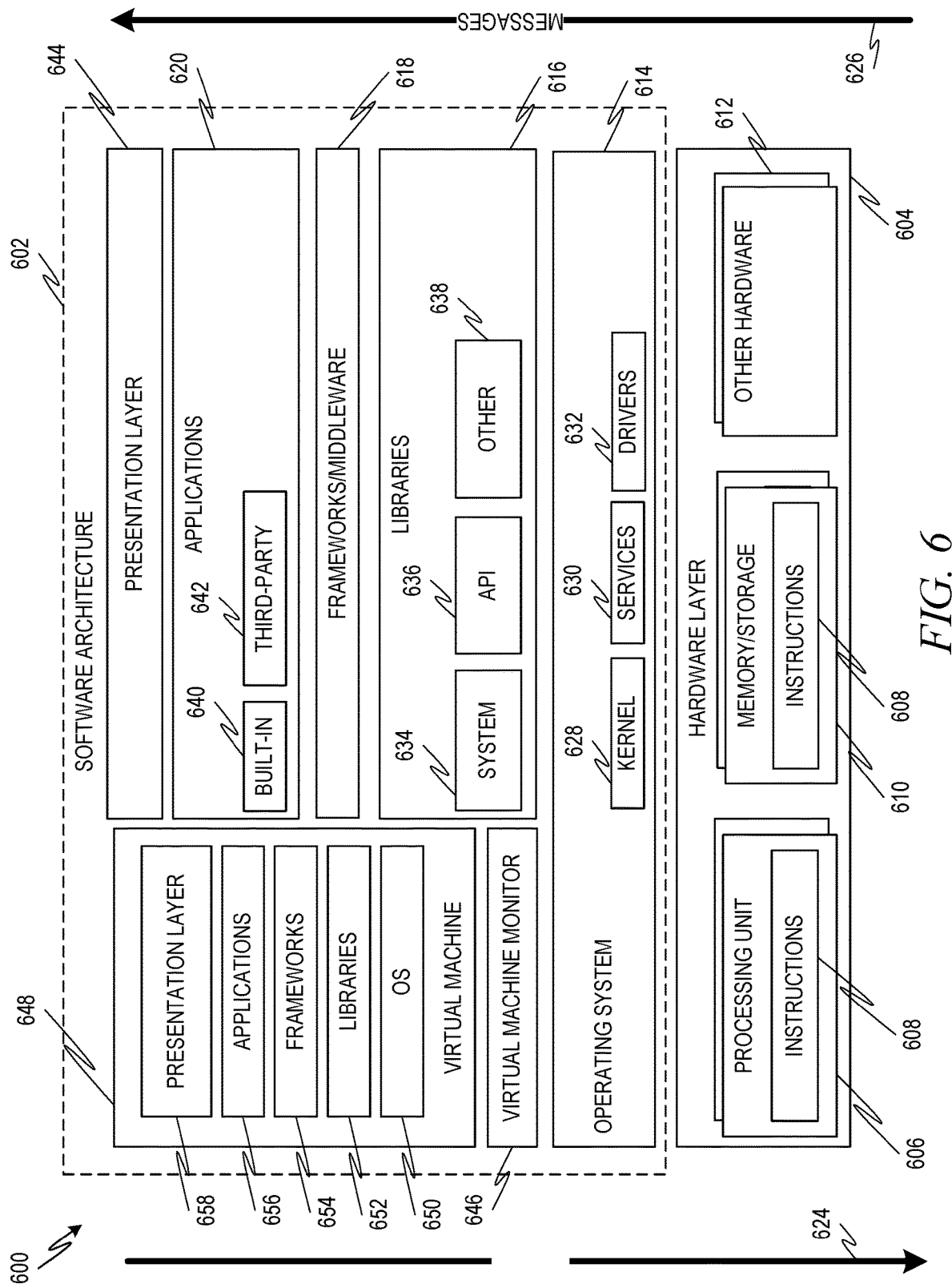
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 6.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third-party applications 642. Examples of representative built-in applications 640 may include, but are not limited to, a contacts application, a browser application, a book reader application, a location application, a median application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630 and/or drivers 632), libraries (e.g., system 634, APIs 636, and other libraries 638), and frameworks/middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and
Machine-Readable Medium

Figure 7:
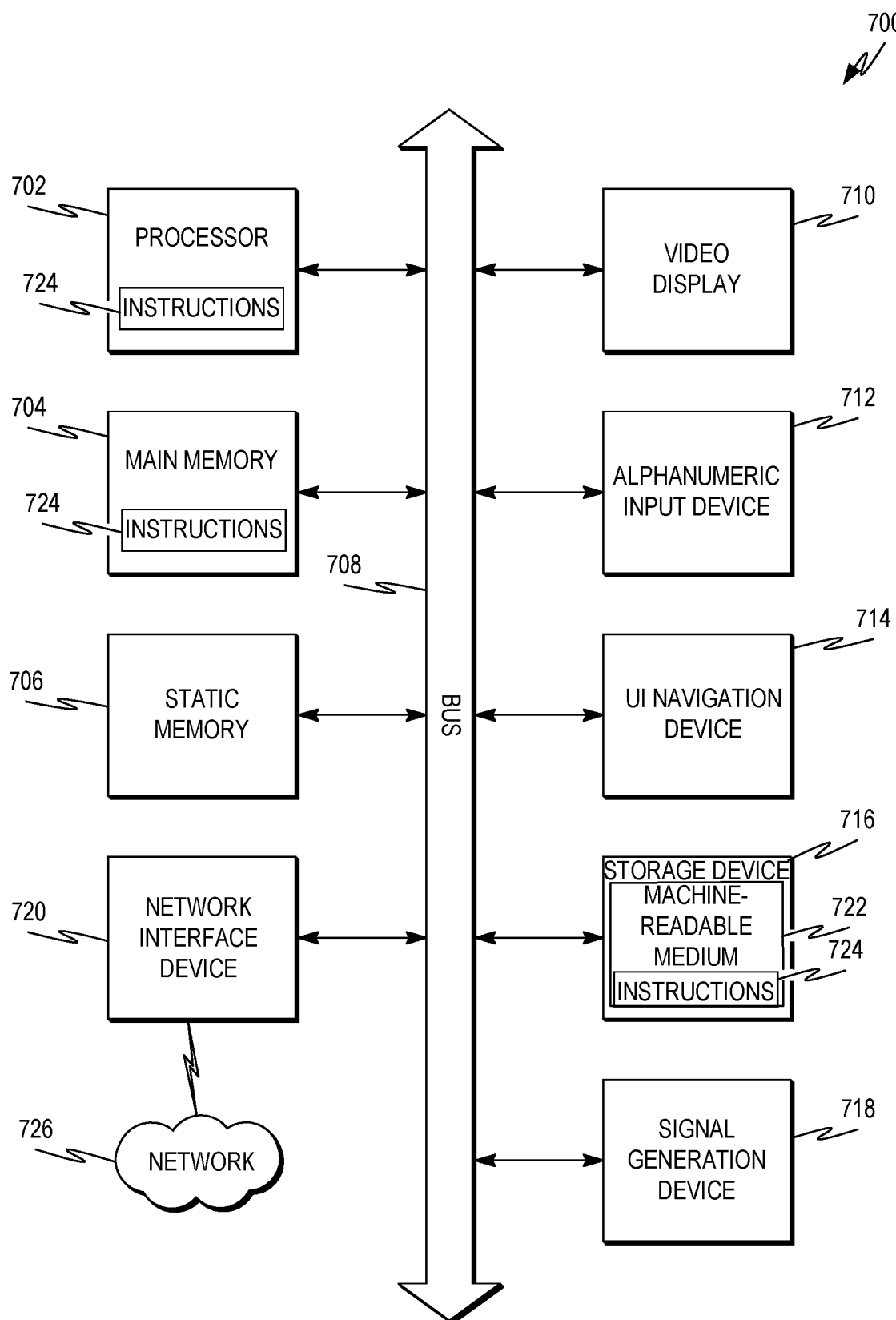
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices: magnetic disks such as internal hard disks and removable disks: magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of monitoring a plurality of container-implemented software application instances, the method comprising:
    executing an orchestration cluster comprising a plurality of orchestration containers;
    executing a ping operator in the orchestration cluster;
    executing a first ping agent in an orchestration container of the plurality of orchestration containers;
    determining, by the ping operator, to assign a first application instance and a second application instance to the first ping agent;
    launching, by the first ping agent, a worker process in the orchestration container;
    launching, by the worker process, a first worker thread in the orchestration container;
    instructing, by the worker process, the first worker thread to monitor the first application instance;
    sending, by the first worker thread, a first ping message to a first application instance executing in a first application container outside the orchestration cluster;
    launching, by the worker process, a second worker thread in the orchestration container;
    instructing, by the worker process, the second worker thread to monitor the second application instance; and
    sending, by the second worker thread, a second ping message to a second application instance executing in a second application container outside the orchestration cluster.

2. The method of claim 1, further comprising:
    sending, by the worker process, an instance request message; and
    receiving, by the worker process, an instance response message, the instance response message describing a plurality of application instances executing outside of the orchestration cluster, the plurality of application instances comprising the first application instance and the second application instance.

3. The method of claim 1, further comprising:
    accessing, by the ping operator, label data describing a plurality of application instances executing outside of the orchestration cluster; and
    writing, by the ping operator, an indication of the first ping agent to a label object of the label data corresponding to the first application instance.

4. The method of claim 3, further comprising:
    determining, by the ping operator, that the label data indicates a newly-executing application instance; and
    assigning the newly-executing application instance to the first ping agent.

5. The method of claim 1, further comprising:
    accessing a resource utilization metric associated with a plurality of ping agents comprising the first ping agent; and
    based on the resource utilization metric, modifying a number of executing ping agents.

6. The method of claim 1, further comprising:
    detecting, by the first ping agent, resource usage in excess of a threshold; and
    restarting, by the first ping agent, the worker process, wherein the first worker thread executes during the restarting of the worker process.

7. The method of claim 1, further comprising:
    generating, by the first worker thread, a first metric describing the first application instance based on the first ping message;
    determining, by an alert manager executing at the orchestration cluster, that the first metric is associated with a negative state of the first application instance; and
    initiating, by the alert manager, an alert message indicating the negative state of the first application instance.

8. The method of claim 1, further comprising:
    receiving, by the first ping agent and from a monitor service of the orchestration cluster, metric template data describing at least one application instance metric; and
    generating, by the first worker thread, metric data describing the first application instance, the metric data being based on the metric template data and the first ping message.

9. A system for monitoring a plurality of container-implemented software application instances, the system comprising:
    a hardware processor programmed to execute operations comprising:
        executing an orchestration cluster comprising a plurality of orchestration containers;
        executing a ping operator in the orchestration cluster;
        executing a first ping agent in an orchestration container of the plurality of orchestration containers;
        determining, by the ping operator, to assign a first application instance and a second application instance to the first ping agent;
        launching, by the first ping agent, a worker process in the orchestration container;

launching, by the worker process, a first worker thread in the orchestration container;

instructing, by the worker process, the first worker thread to monitor the first application instance;

sending, by the first worker thread, a first ping message to the first application instance executing in a first application container outside the orchestration cluster;

launching, by the worker process, a second worker thread in the orchestration container;

instructing, by the worker process, the second worker thread to monitor the second application instance; and sending, by the second worker thread, a second ping message to the second application instance executing in a second application container outside the orchestration cluster.

10. The system of claim 9, the operations further comprising:

sending, by the worker process, an instance request message; and receiving, by the worker process, an instance response message, the instance response message describing a plurality of application instances executing outside of the orchestration cluster, the plurality of application instances comprising the first application instance and the second application instance.

11. The system of claim 9, the operations further comprising:

accessing, by the ping operator, label data describing a plurality of application instances executing outside of the orchestration cluster; and writing, by the ping operator, an indication of the first ping agent to a label object of the label data corresponding to the first application instance.

12. The system of claim 11, the operations further comprising:

determining, by the ping operator, that the label data indicates a newly-executing application instance; and assigning the newly-executing application instance to the first ping agent.

13. The system of claim 9, the operations further comprising:

accessing a resource utilization metric associated with a plurality of ping agents comprising the first ping agent; and based on the resource utilization metric, modifying a number of executing ping agents.

14. The system of claim 9, the operations further comprising:

detecting, by the first ping agent, resource usage in excess of a threshold; and restarting, by the first ping agent, the worker process, wherein the first worker thread executes during the restarting of the worker process.

15. The system of claim 9, the operations further comprising:

generating, by the first worker thread, a first metric describing the first application instance based on the first ping message;

determining, by an alert manager executing at the orchestration cluster, that the first metric is associated with a negative state of the first application instance; and initiating, by the alert manager, an alert message indicating the negative state of the first application instance.

16. The system of claim 9, the operations further comprising:

receiving, by the first ping agent and from a monitor service of the orchestration cluster, metric template data describing at least one application instance metric; and generating, by the first worker thread, metric data describing the first application instance, the metric data being based on the metric template data and the first ping message.

17. A non-transitory machine-readable medium comprising instructions thereon that, when executed by at least one hardware processor, causes the at least one hardware processor to perform operations comprising:

executing an orchestration cluster comprising a plurality of orchestration containers;

executing a ping operator in the orchestration cluster;

executing a first ping agent in an orchestration container of the plurality of orchestration containers;

determining, by the ping operator, to assign a first application instance and a second application instance to the first ping agent;

launching, by the first ping agent, a worker process in the orchestration container;

launching, by the worker process, a first worker thread in the orchestration container;

instructing, by the worker process, the first worker thread to monitor the first application instance;

sending, by the first worker thread, a first ping message to a first application instance executing in a first application container outside the orchestration cluster;

launching, by the worker process, a second worker thread in the orchestration container;

instructing, by the worker process, the second worker thread to monitor the second application instance; and sending, by the second worker thread, a second ping message to a second application instance executing in a second application container outside the orchestration cluster.

18. The medium of claim 17, the operations further comprising:

sending, by the worker process, an instance request message; and receiving, by the worker process, an instance response message, the instance response message describing a plurality of application instances executing outside of the orchestration cluster, the plurality of application instances comprising the first application instance and the second application instance.

19. The medium of claim 17, the operations further comprising:

accessing, by the ping operator, label data describing a plurality of application instances executing outside of the orchestration cluster; and writing, by the ping operator, an indication of the first ping agent to a label object of the label data corresponding to the first application instance.

20. The medium of claim 19, the operations further comprising:

determining, by the ping operator, that the label data indicates a newly-executing application instance; and assigning the newly-executing application instance to the first ping agent.

* * * * *